United States Patent
Nukada et al.

[11] Patent Number: 5,298,617
[45] Date of Patent: Mar. 29, 1994

[54] OXYTITANIUMPHTHALOCYANINE HYDRATE CRYSTAL AND ELECTROPHOTOGRAPHIC PHOTORECEPTOR USING SAID CRYSTAL

[75] Inventors: Katsumi Nukada; Katsumi Daimon; Masakazu Iijima; Yasuo Sakaguchi; Hidemi Nukada; Akihiko Tokida, all of Kanagawa, Japan

[73] Assignee: Fuji Xerox Co., Ltd., Tokyo, Japan

[21] Appl. No.: 757,218

[22] Filed: Sep. 10, 1991

[30] Foreign Application Priority Data

Nov. 22, 1990 [JP]   Japan ................. 2-316072

[51] Int. Cl.$^5$ .................................... C09B 47/04
[52] U.S. Cl. ........................... 540/141; 430/58; 430/78
[58] Field of Search ........................... 540/141

[56] References Cited

U.S. PATENT DOCUMENTS

| | | | |
|---|---|---|---|
| 2,770,629 | 11/1956 | Eastes | 540/141 |
| 3,160,635 | 12/1964 | Knudsen et al. | 540/141 |
| 3,357,989 | 12/1967 | Byrne et al. | 540/141 |
| 3,708,292 | 1/1973 | Brach et al. | 540/141 |

FOREIGN PATENT DOCUMENTS 0384470  8/1990  European Pat. Off. ............ 540/141

OTHER PUBLICATIONS

JP-A-50-38543 Abstract.
JP-A-62-67094 Abstract.
JP-A-61-217050 Abstract.
JP-A-63-366 Abstract.
JP-A-64-17066 Abstract.
JP-A-1-153757 Abstract.
JP-A-63-20365 Abstract.

*Primary Examiner*—Thurman K. Page
*Assistant Examiner*—Jyothsna Venkat
*Attorney, Agent, or Firm*—Finnegan, Henderson, Farabow, Garrett & Dunner

[57]  ABSTRACT

Oxytitanium phthalocyanine hydrate crystal and an electrophotographic photoreceptor using said crystal are disclosed. The structural formula of the crystal is TiOPc(H$_2$O)$_n$ wherein Pc represents a phthalocyanine residual group, and n represents from 0.15 to 1; and the elemental analysis values of C, H and N are as follows: C: 65.0 to 66.3%; H: 2.5 to 3.1%; and N: 18.5 to 19.3%.

3 Claims, 8 Drawing Sheets

OXYTITANIUMPHTHALOCYANINE HYDRATE CRYSTAL AND ELECTROPHOTOGRAPHIC PHOTORECEPTOR USING SAID CRYSTAL

FIELD OF THE INVENTION

The present invention relates to an oxytitaniumphthalocyanine hydrate crystal useful as a photoconductive material, and an electrophotographic photoreceptor using the crystal.

BACKGROUND OF THE INVENTION

Phthalocyanines are useful for preparation of paints, printing inks, catalysts, or electronic materials. In recent years, they have been extensively investigated for use in materials for electrophotographic photoreceptor, optical recording materials, and photoelectric conversion materials.

In connection with electrophotographic photoreceptor, a laser printer utilizing semiconductor laser has been increasingly demanded, and various photoconductive materials for the semiconductor laser have been proposed. In particular, a large number of phthalocyanine compounds as photoconductive materials have been reported.

It is known that a phthalocyanine compound generally exhibits varied crystal forms depending on a method of preparation and a method of processing thereof, and that this difference in crystal form exerts great influences on photoelectric conversion characteristics of the phthalocyanine compound.

In connection with the crystal form of the phthalocyanine compound, in the case of copper phthalocyanine, for example, as well as a $\beta$-type crystal form which is of the stabilized system, $\alpha$-, $\pi$-, $\chi$-, $\rho$-, $\gamma$-, $\delta$-, and like crystal forms are known. It is also known that the above crystal forms can transfer from one another upon application of mechanical stress, sulfuric acid treatment, organic solvent treatment, or heat treatment (see, for example, U.S. Pat. Nos. 2,770,629, 3,160,635, 3,708,292, and 3,357,989). In addition, JP-A-50-38543 (the term "JP-A" as used herein means an "unexamined Japanese patent application") describes a relation between the crystal form of copper phthalocyanine and electrophotographic characteristics.

In connection with the crystal form of oxytitanium phthalocyanine, and electrophotographic characteristics, JP-A-62-67094 describes the $\beta$-type crystal form which is of the stabilized system, and JP-A-61-2170506 describes the $\alpha$-type crystal form obtained by the acid pesting method or the solvent treatment. In addition, JP-A-63-366, 64-17066, 1-153757, and for example, describe crystal forms other than the $\alpha$- and $\beta$-crystal forms.

It is generally well known that doping of impurities in organic or inorganic semiconductors results in great changes of electric characteristics thereof.

N.R. Armstrong et al report doping of $I_2$, and changes of photoconductive characteristics due to adsorption of $O_2$, $H_2O$, etc., in an oxytitaniumphthalocyanine vacuum deposited film (AIP Conf. Proc., 167 (1988), Proc. Electrochem. Soc., 88-14, 67 (1987), and J. Phys. Chem., Vol. 91, 5646 (1987)).

The aforementioned conventional oxytitanium phthalocyanine compounds, however, have poor crystallinity in solvents and thus cannot hold their crystal forms for a long time in the state after being dispersed and coated. Moreover, when used as photosensitive materials, they are not yet satisfactory in light sensitivity and durability.

SUMMARY OF THE INVENTION

An object of the present invention is to provide oxytitanium phthalocyanine hydrate crystal which is useful as an electrophotographic photosensitive material.

Another object of the present invention is to provide an electrophotographic photoreceptor containing a photosensitive layer containing therein an oxytitanium phthalocyanine hydrate crystal.

It has been found that the water of crystallization contained in oxytitanium phthalocyanine crystals exerts influences on the sensitivity, and that hydrate crystals containing the specified amount of water of crystallization have high sensitivity and durability as photoconductive materials.

The present invention relates to an oxytitanium phthalocyanine hydrate crystal having the structural form, $TiOPc(H_2O)_n$, wherein Pc is a phthalocyanine residual group, and n represents from 0.15 to 1; and the crystal further has the following elemental analytical values of C, H and N when the crystal is dried for 8 hours at a temperature of 100° C under a pressure of 0.1 mmHg and the allowed to stand in an air atmosphere for 12 hours under conditions of room temperature and ordinary pressure:

C: 65.0 to 66.3%;
H: 2.5 to 3.1%; and
N: 18.5 to 19.3%.

The present invention further relates to an electrophotographic photoreceptor comprising a substrate having thereon a photosensitive layer, wherein the photosensitive layer contains the above oxytitanium phthalo-cyanine hydrate crystal.

1: Electrically conductive substrate,
2: Charge generating layer,
3: Charge transporting layer,
4: Undercoating layer,
5: Photoconductive layer.

DETAILED DESCRIPTION OF THE INVENTION

In the oxytitanium phthalocyanine hydrate crystal of the present invention, the ignition loss at 200° C. (i.e., the weight loss (weight reduction) of the crystal when the crystal is heated to 200° C.) is within a range of 0.6 to 3%.

As the oxytitanium phthalocyanine hydrate crystal to be used as the above photoconductive material in the present invention, those having an X-ray diffraction pattern in which the maximum diffraction peak is present at a Bragg angle ($2\theta \pm 0.2$) of 27.3°, are preferably used. The crystal has further other diffraction peaks at 24.0°, 18.0° and 14.3°. Further, since the crystal has photosensitivity in a wavelength region extending to the longer side, it is very useful as a photoconductive material of an electrophotographic photoreceptor of, for example, a printer utilizing a semiconductor laser as a light source.

The present invention will hereinafter be explained in detail.

The above oxytitanium phthalocyanine hydrate crystal of the present invention can be obtained by crystal conversion techniques such as the acid paste method (for example, as described in U.S. patent application Ser. No. 670,778 filed on Mar. 19, 1991).

First, oxytitanium phthalocyanine obtained by synthesis is introduced into concentrated sulfuric acid to dissolve therein or prepare a slurry. The concentration of the concentrated sulfuric acid is usually from 70 to 100 wt% and preferably from 95 to 100 wt%. The temperature to make a solution or slurry is set to the range of $-20°$ C. to 100° C., preferably 0 to 60° C. The amount of the concentrated sulfuric acid used is in a range of 1 to 100 times, preferably 3 to 50 times the weight of the oxytitanium phthalocyanine.

Then, the concentrated sulfuric acid solution or slurry obtained above is introduced into a solvent to precipitate therein crystals.

As these solvents, alcohol-based solvents, aromatic solvents, mixed solvents of alcohol-based solvents and water, mixed solvents of alcohol-based solvents and aromatic solvents, and mixed solvents of aromatic solvents and water can be used. Examples of the alcohol-based solvent include those having up to 5 carbon atoms such as methanol and ethanol. Examples of the aromatic solvent include aromatic hydrocarbons such as xylene, benzene, and toluene; aromatic halogen compounds such as monochlorobenzene, dichlorobenzene, chloronaphthalene and trichlorobenzene; aromatic nitro compounds such as nitrobenzene; and phenol.

In the case of the mixed solvents, the mixing ratio (by weight) of the alcohol-based solvent to water (alcohol-based solvent/water) is 100/0 to 10/90 and preferably 100/0 to 40/60; the mixing ratio (by weight) of the alcohol-based solvent to the aromatic solvent (alcohol-based solvent/aromatic solvent) is 100/0 to 10/90 and preferably 100/0 to 50/50; and the mixing ratio (by weight) of the aromatic solvent to water (aromatic solvent/water) is 100/1 to 1/99 and preferably 60/40 to 5/95.

The amount of the solvent used is chosen from the range of 2 to 50 times, preferably 5 to 20 times the volume of the concentrated sulfuric acid solution or slurry. The temperature of the solvent or the mixed solvent is set within the range of $-50°$ C. to 100° C., preferably not more than 10° C.

Precipitated crystals are isolated by filtration, or after isolation, are subjected to solvent treatment or grinding treatment in a solvent. In the solvent washing and the solvent treatment, alcohol-based solvents, aromatic solvents, mixed solvents of alcohol-based solvents and water, mixed solvents of alcohol-based solvents and aromatic solvents or mixed solvents of aromatic solvents and water are used. Oxytitanium phthalocyanine crystals isolated are washed with the above solvents, or treated by stirring in the solvents at a temperature of room temperature to 100° C. for a time of 1 to 5 hours.

For the grinding treatment, an attritor, a roll mill, a ball mill, a sand mill, a homomixer an so forth can be used, although the present invention is not limited thereto. The amount of the solvent used in the grinding treatment is preferably within the range of 5 to 50 times the weight of the oxytitanium phthalocyanine. Solvents which can be used include water, alcohol-based solvents, aromatic solvents, mixed solvents of alcohol-based and water, mixed solvents of alcohol-based solvents and aromatic solvents, and mixed solvents of aromatic solvents and water. Examples of such alcohol-based solvents include methanol and ethanol. Examples of such aromatic solvents include benzene, toluene, monochlorobenzene, dichlorobenzene, trichlorobenzene, and phenol.

In the case of the mixed solvents, the mixing ratio (by weight) of the alcohol-based solvent to water (alcohol-based solvent/water) is 100/0 to 10/90 and preferably 100/0 to 50/50, and the mixing ratio (by weight) of the aromatic solvent to water (aromatic solvent/water) is 100/0 to 1/99 and preferably 60/40 to 3/97.

It is also effective that the crystals precipitated by the acid pasting method are heated with stirring in a diluted sulfuric acid solution before the isolation thereof.

When the aforementioned oxytitanium phthalocyanine crystal of the present invention is used as a material for an electrophotographic photoreceptor, there are no special limitations to the particle size thereof. However, from viewpoints of image quality and so forth, those crystals having a primary particle diameter of 0.03 to 0.15 μm (particularly 0.04 to 0.09 μm) are preferably used.

Next, an electrophotographic photoreceptor using the aforementioned oxytitanium phthalocyanine hydrate crystal as a photoconductive material of a photosensitive layer is explained referring to the accompanying drawings.

Figure 15A:
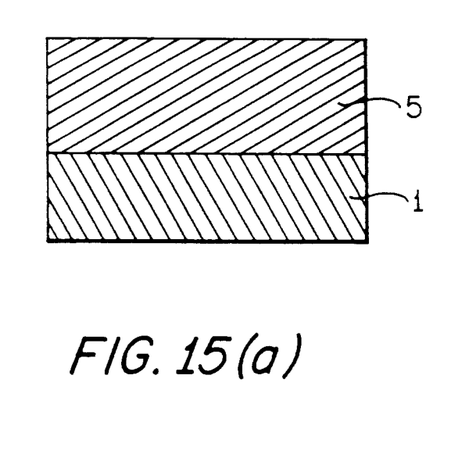
Figure 15B:
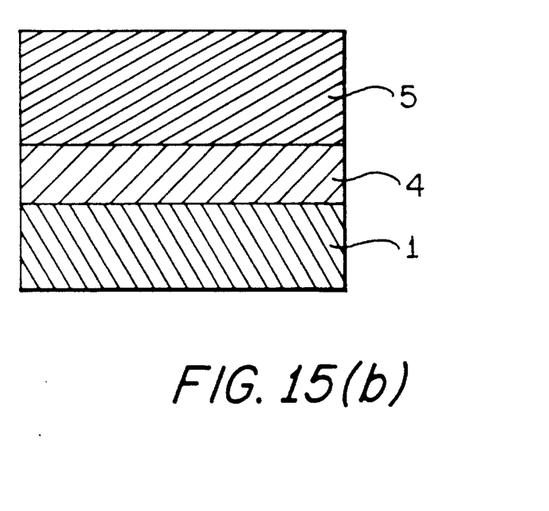

FIGS. 14 and 15 are schematic views illustrating the layer structure of the electrophotographic photoreceptor of the present invention. In FIG. 14, (a) to (d) show examples in which the photosensitive layer has the laminate type structure. In (a), a charge generating layer 2 is formed on an electrically conductive substrate 1, and a charge transporting layer 3 is provided thereon. In (b), the charge transporting layer 3 is formed on the electrically conductive substrate 1, and the charge generating layer 2 is provided thereon. In (c) and (d), an undercoating layer 4 is provided on the electrically conductive substrate 1. FIG. 15 shows an example in which the photosensitive layer has the single layer structure. In (a), a photoconductive layer 5 is provided on the electrically conductive substrate 1, and in (b), the undercoating layer 4 is provided on the electrically conductive substrate 1.

When the electrophotographic photoreceptor of the present invention has the laminate type structure as shown in FIG. 14, the charge generating layer comprises the aforementioned oxytitanium phthalocyanine hydrate crystal and a binder resin. The binder resin can be chosen from a wide variety of insulative resins. In addition, the binder resin can be chosen from organic photoconductive polymers such as poly-N-vinyl carbazole, polyvinyl anthrathene, and polyvinyl pyrene. Preferred binder resins include insulative resins such as polyvinyl butyral, polyarylate (e.g., polycondensate of bisphenol A and phthalic acid), polycarbonate, polyester, a phenoxy resin, a copolymer of a vinyl chloride and a vinyl acetate, polyvinyl acetate, an acryl resin, polyacrylamide, polyamide, polyvinyl pyridine, cellulose-based resins, a urethane resin, an epoxy resin, casein, polyvinyl alcohol, and polyvinyl pyrrolidone.

The charge generating layer is formed by coating a coating solution dispersing the aforementioned oxytitanium phthalocyanine hydrate crystal in a solution which has been prepared by dissolving the aforementioned binder resin in an organic solvent, on a pre-prepared charge transporting layer, a pre-prepared undercoating layer or an electrically conductive substrate. In this case, the ratio of the oxytitanium phthalocyanine hydrate crystal to the binder resin is 40:1 to 1:10 and preferably 10:1 to 1:4. If the proportion of the oxytitanium phthalocyanine hydrate crystal is too high, the stability of the coating solution is decreased, and if it is too low, the sensitivity is decreased.

The solvent to be used for preparation of the coating solution is preferably chosen from those in which the lower layer is not dissolved. Specific examples of the organic solvent are alcohols such as methanol, ethanol, and isopropanol; ketones such as acetone, methyl ethyl ketone, and cyclohexanone; amides such as N,N-dimethylformamide, and N,N-dimethylacetamide; dimethylsulfoxides; ethers such as tetrahydrofuran, dioxane, and ethylene glycol monomethyl ether; esters such as methyl acetate, and ethyl acetate; halogenated aliphatic hydrocarbons such as chloroform, methylene chloride, dichloroethylene, carbon tetrachloride, and trichloroethylene, and aromatic hydrocarbons such as benzene, toluene, xylene, ligroin, mono-chlorobenzene, and dichlorobenzene.

The coating solution can be coated by known coating techniques such as a dip coating, a spray coating, a spinner coating, a bead coating, a wire bar coating, a blade coating, a roller coating, and a curtain coating. In connection with drying, it is preferred to employ a method in which the coating is dried to the touch at room temperature and then dried by heating. The heat drying can be carried out at a temperature of 50 to 200° C. for a time of 5 minutes to 2 hours while sending or not sending air. Coating is usually carried out so that the thickness of the charge generating layer is within the range of 0.05 to 5 $\mu$m (preferably 0.05 to 2 $\mu$m).

The charge transporting layer comprises a charge transporting material and binder resin.

As the charge transporting material, any of known materials such as polycyclic aromatic compounds, e.g., anthracene, pyrene, and phenanthrene; nitrogen-containing heterocyclic compounds, e.g., indole, carbazole, and imidazole; pyrazoline compounds; hydrazone compounds; triphenylmethane compounds; triphenylamine compounds; enamine compounds; and stilbene compounds, can be used.

In addition, photoconductive polymers, such as poly-N-vinyl carbazole, halogenated poly-N-vinyl carbazole, polyvinyl anthracene, poly-N-vinylphenyl anthracene, polyvinyl pyrene, polyvinylacridine, polyvinylacenaphthylene, polyglycidyl carbazole, a pyrene-formaldehyde resin, and an ethylcarbazoleformaldehyde resin, can be used. These polymers may form the charge transporting layer by themselves.

As the binder resin, the same insulative resins as listed for the charge generating layer can be used.

The charge transporting layer can be formed by coating a coating solution containing a charge transporting material, a binder resin as described above, and an organic solvent which does not dissolve the under layer as described above, in the same manner as in the formation of the charge generating layer. The compounding ratio (parts by weight) of the charge transporting material to the binder resin is usually set within the range of 5:1 to 1:5. The thickness of the charge transporting layer is usually within the range of about 5 to 50 $\mu$m (preferably 10 to 30 $\mu$m).

When the electrophotographic photoreceptor of the present invention has the single layer structure shown in FIG. 15, the photosensitive layer is a photoconductive layer having the structure that the aforementioned oxytitanium phthalocyanine hydrate crystal is dispersed in a layer comprising a charge transporting material and a binder resin. In this case, the compounding ratio of the charge transporting material to the binder resin is preferably within the range of 1:20 to 5:1, and the mixing ratio of the oxytitanium phthalocyanine hydrate crystal to the charge transporting material is preferably within the range of 1:10 to 10:1. The same charge transporting materials and binder resins as described above can be used, and the photoconductive layer is formed in the same manner as described above.

As the electrically conductive substrate, any known substrate which can be used in preparation of the electrophotographic photoreceptor, can be employed.

In the present invention, the undercoating layer may be provided on the electrically conductive substrate. The undercoating layer is effective in blocking the injection of unnecessary electric charges from the electrically conductive substrate, and acts to increase the chargeability of the photosensitive layer. Furthermore, the undercoating layer acts to increase adhesion between the photosensitive layer and the electrically conductive substrate. Materials which can be used to form the undercoating layer include polyvinyl alcohol, polyvinyl pyrrolidone, polyvinyl pyridine, cellulose ethers, cellulose esters, polyamide, polyurethane, casein, gelatin, polyglutamic acid, starch, starch acetate, amino starch, polyacrylic acid, polyacrylamide, a zirconium chelate compound, a zirconium alkoxide compound, an organic zirconium compound, a titanyl chelate compound, a titanyl alkoxide compound, an organic titanyl compound, and a silane coupling agent. The thickness of the undercoating layer is preferably within the range of about 0.05 to 2 $\mu$m.

The oxytitanium phthalocyanine hydrate crystal of the present invention is, as described above, in the form of hydrate, and this water of crystallization produces the sensitization effect. Accordingly the oxytitanium phthalocyanine hydrate crystal of the present invention is very useful as a photoconductive material for an electrophotographic photoreceptor such as a printer utilizing a semiconductor laser. Furthermore, the electrophotographic photoreceptor of the present invention, using the above oxytitanium phthalocyanine hydrate crystal, has excellent sensitivity and durability.

The present invention is described in greater detail with reference to the following examples.

Figure 2:
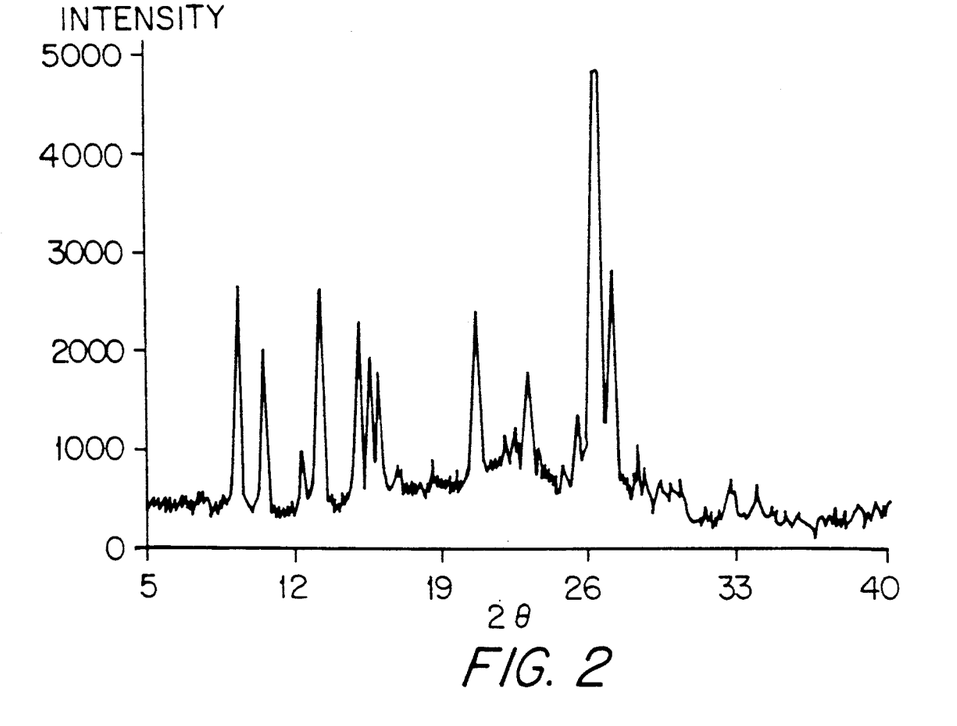
FIG. 2 is an X-ray diffraction pattern of the oxytitanium phthalocyanine hydrate crystal obtained in Preparation Example.

EXAMPLE OF PREPARATION OF OXYTITANIUM PHTHALOCYANINE 3 parts of 1,3-diminoisoindoline, and 1.7 parts of titanium tetrabutoxide were placed in 20 parts of 1-chloronaphthalene, and then reacted at 190° C. for 5 hours. The reaction product was separated by filtration, and washed with ammonia water, water and acetone to obtain 4.0 parts of oxytitanium phthalocyanine crystals. A powder X-ray diffraction pattern of the thus-obtained oxytitanium phthalocyanine crystal is shown in FIG. 2.

EXAMPLE 1

Figure 1:
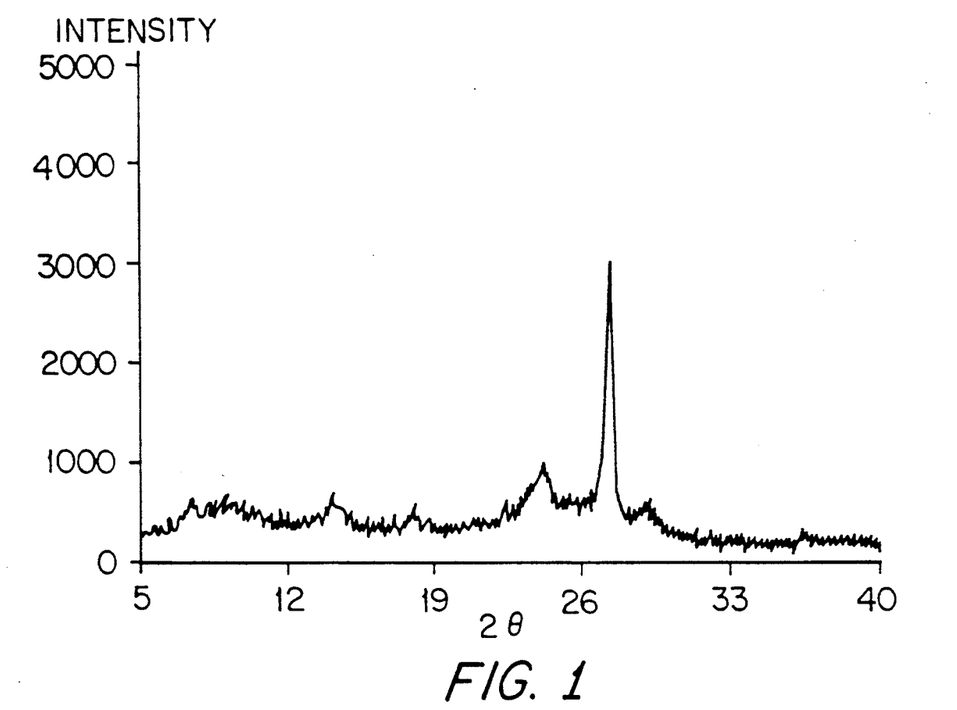
FIG. 1 is an X-ray diffraction pattern of the oxytitanium phthalocyanine hydrate crystal obtained in Example 1.

2.0 parts of the oxytitanium phthalocyanine obtained in Preparation Example was dissolved in 100 parts of 97% sulfuric acid at 0° C., and then poured into a mixed solvent of 400 parts of ethanol and 400 parts of water which had been cooled with ice. Precipitated crystals were separated by filtration, and washed with methanol, with diluted ammonia water and then with water. They were then dried to obtain 1.6 parts of oxytitanium phthalocyanine hydrate crystals. A powder X-ray diffraction pattern of the oxytitanium phthalocyanine hydrate crystal is shown in FIG. 1.

EXAMPLE 2

Figure 3:
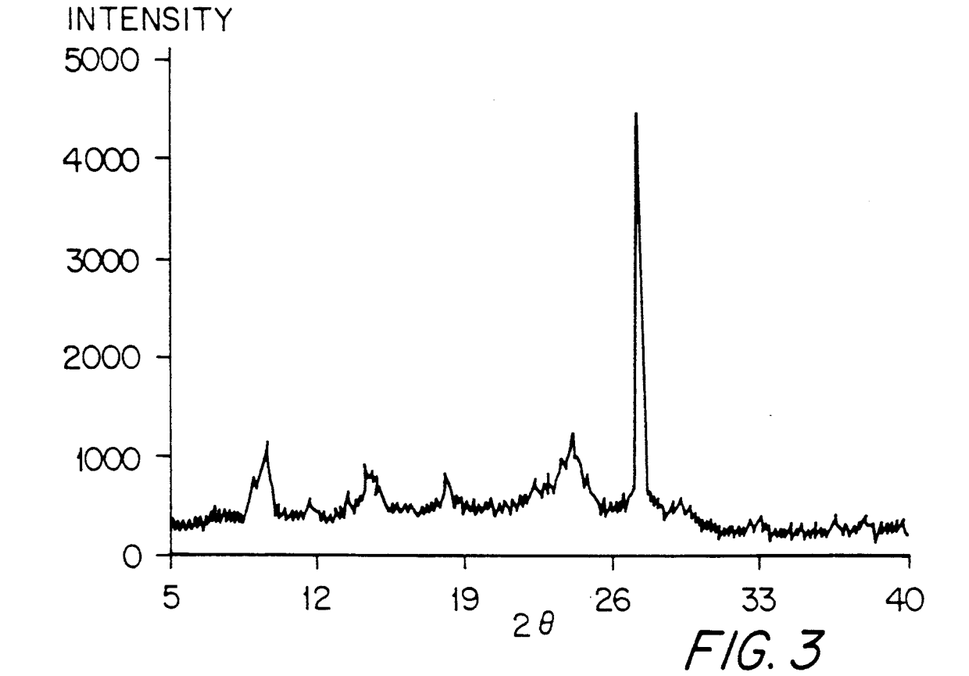
FIGS. 3 to 5 are X-ray diffraction patterns of the oxytitanium phthalocyanine hydrate crystals obtained in Examples 2 to 4, respectively.

2.0 parts of the oxytitanium phthalocyanine obtained in Preparation Example was dissolved in 100 parts of 97% sulfuric acid at 0° C., and then poured into a mixed solvent of 400 parts of monochlorobenzene and 400 parts of methanol which had been cooled with ice. Precipitated crystals were separated by filtration, and washed with methanol, with diluted ammonia water and then with water. These crystals were then dried to obtain 1.6 parts of oxytitanium phthalocyanine hydrate crystals. A powder X-ray diffraction pattern of the oxytitanium phthalocyanine hydrate crystal is shown in FIG. 3.

EXAMPLE 3

Figure 4:
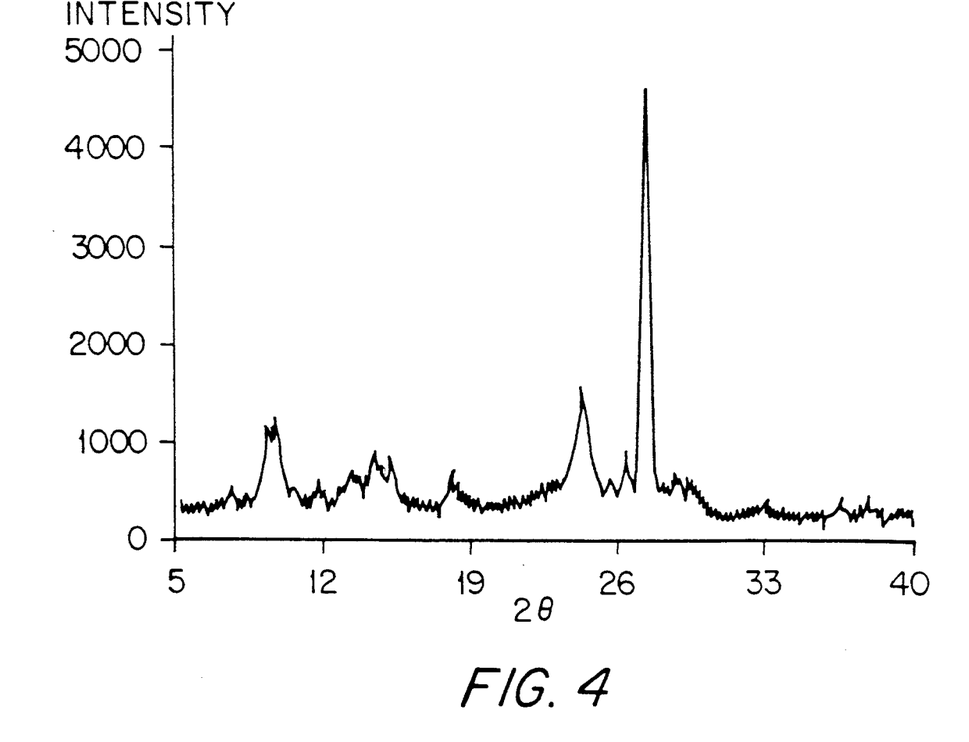

2 0 parts of the oxytitanium phthalocyanine obtained in Preparation Example was dissolved in 100 parts of 97% sulfuric acid at 0° C., and then poured into a mixed solvent of 400 parts of methanol and 400 parts of water which had been cooled with ice. Precipitated crystals were separated by filtration, and washed with methanol, with diluted ammonia water and then with water. The water-containing oxytitanium phthalocyanine cake thus obtained was placed in a mixed solvent of 20 parts of water and 2 parts of monochlorobenzene, stirred at 50° C. for 1 hour, separated by filtration, washed with methanol and then with water, and then dried to obtain 1.6 parts of oxytitanium phthalocyanine hydrate crystals. A powder X-ray diffraction pattern of the oxytitanium phthalocyanine hydrate crystal is shown in FIG. 4.

COMPARATIVE EXAMPLE 1

Figure 5:
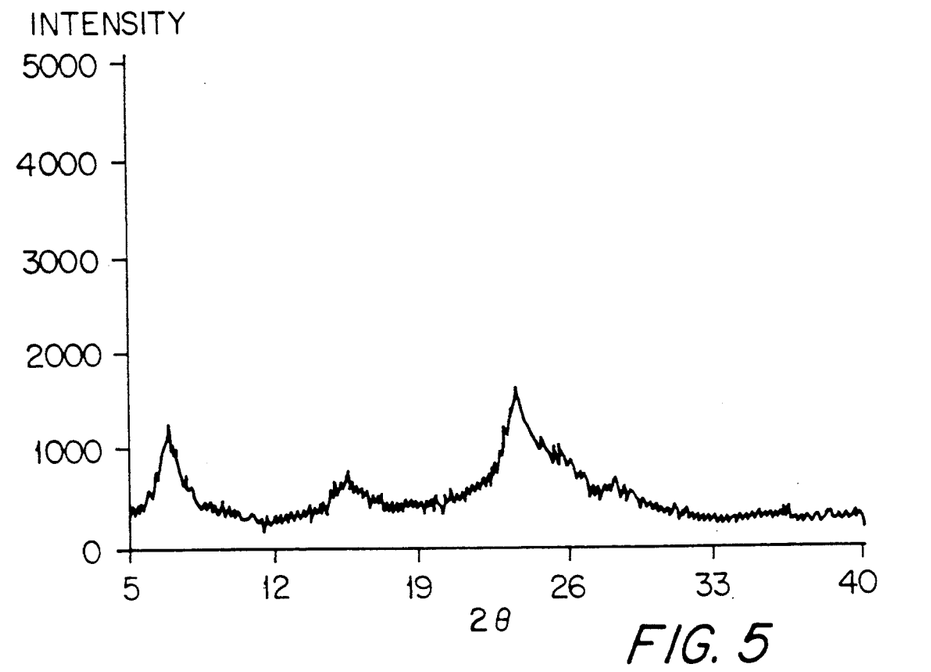

4.0 parts of the oxytitanium phthalocyanine obtained in Preparation Example was dissolved in 100 parts of 97% sulfuric acid at 0° C, and then poured into 2,500 parts of water cooled with ice. Precipitated crystals were separated by filtration, and washed with methanol, with diluted ammonia water and then with water. The water-containing oxytitanium phthalocyanine cake thus obtained was stirred in 20 parts of methanol at 50° C. for 1 hour, separated by filtration, washed with methanol and water, and then dried to obtain 3.6 parts of meta-amorphous m-type oxytitanium phthalocyanine crystals. A powder X-ray diffraction pattern of the above oxytitanium phthalocyanine crystal is shown in FIG. 5.

COMPARATIVE EXAMPLE 2

Figure 6:
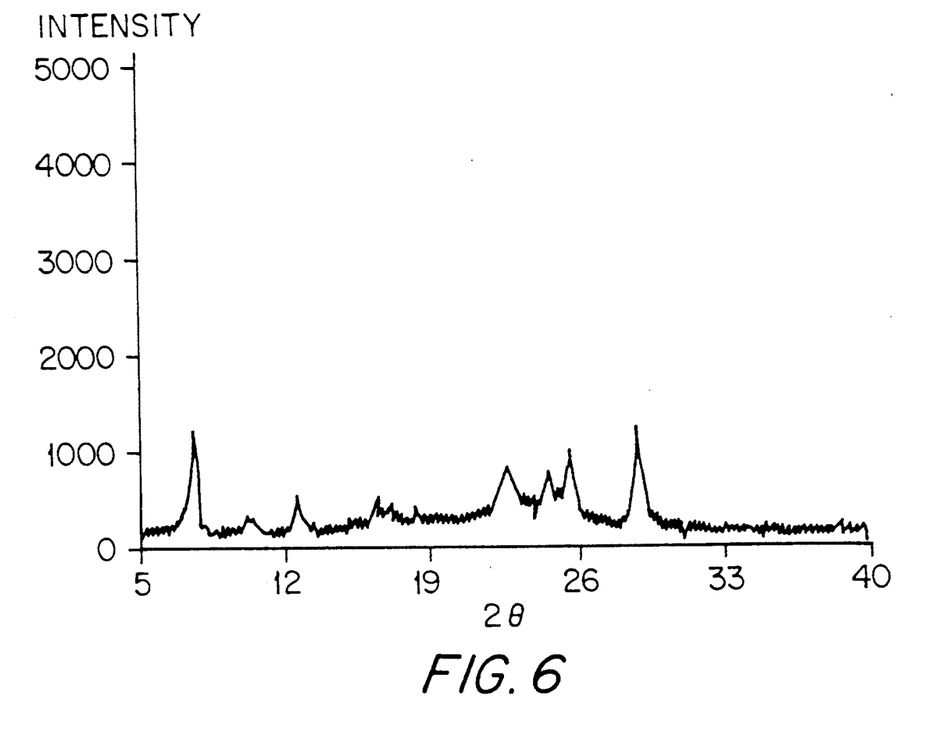
FIGS. 6 to 8 are X-ray diffraction patterns of the oxytitanium phthalocyanine hydrate crystals obtained in Comparative Examples 1 to 3, respectively.

1.2 parts of the meta-amorphous m-type oxytitanium phthalocyanine crystals obtained in Comparative Example 1 was stirred in 10 parts of methylene chloride for 120 hours, separated by filtration, and dried to obtain 1.1 parts of α-type oxytitanium phthalocyanine crystals. A powder X-ray diffraction pattern of the crystal is shown in FIG. 6.

Figure 7:
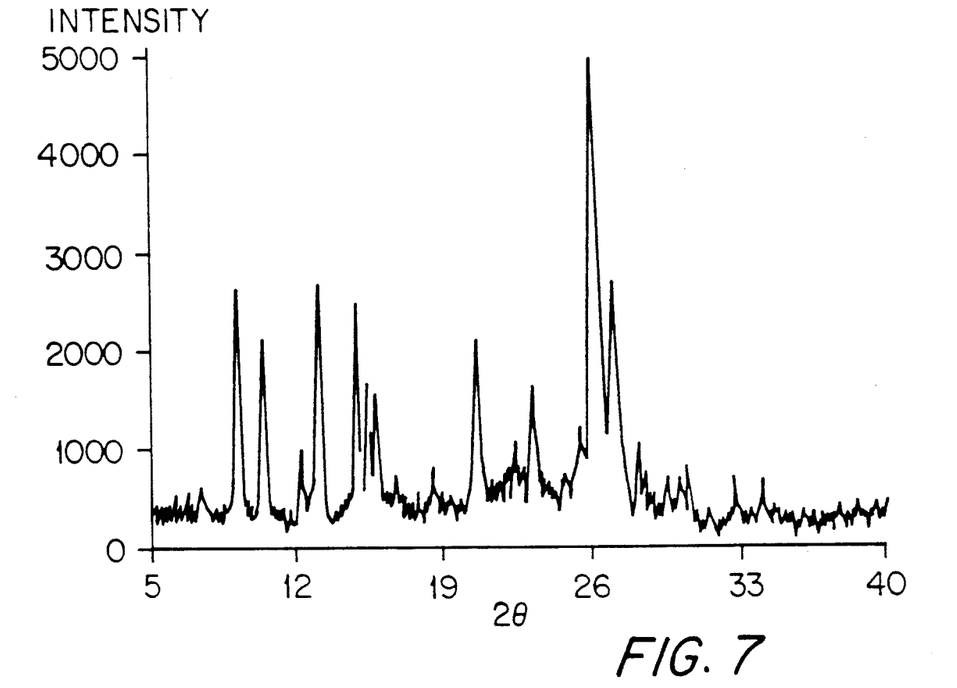

COMPARATIVE EXAMPLE 3

β-type oxytitanium phthalocyanine crystals were obtained in the same manner as in Comparative Example 2 except that N-methylpyrrolidone was used in place of methylene chloride. A powder X-ray diffraction pattern of the crystal is shown in FIG. 7.

EXAMPLE 4

Figure 8:
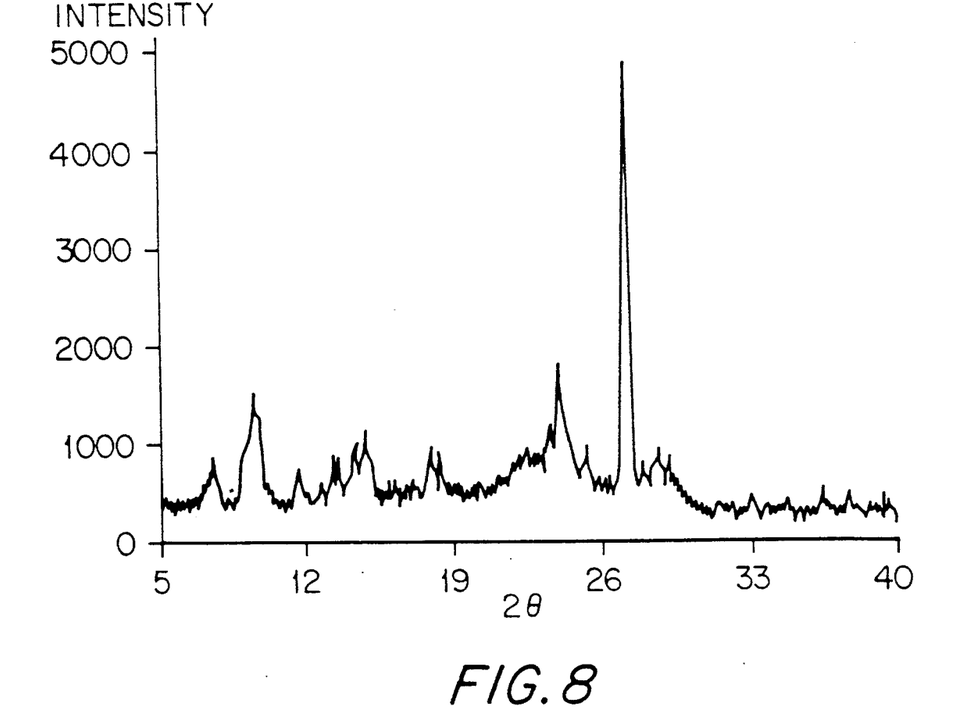

1.2 parts of the metaamorphous m-type oxytitanium phthalocyanine crystals obtained in Comparative Example 1 were stirred in a mixed solvent of 30 parts of water and 2 parts of monochlorobenzene at 50° C. for 1 hours, separated by filtration, and dried to obtain 1.1 parts of oxytitanium phthalocyanine hydrate crystals. A powder X-ray diffraction pattern of the crystal is shown in FIG. 8.

The crystals obtained in Preparation Example, Examples 1 to 4, and Comparative Examples 1 to 3 were dried for 8 hours at 100° C. under a reduced pressure of 0.1 mmHg, and were allowed to stand for 12 hours at room temperature in an air atmosphere under atmospheric pressure. At this point, elemental analytical values and the ignition loss of the crystal when the crystal was heated to 200° C., were measured. The results are shown in Table 1.

TABLE 1

| | Elemental Analysis (%) | | | Ignition |
| --- | --- | --- | --- | --- |
| | C | H | N | Loss (wt %) |
| Theoretical Value Calculated as $C_{32}H_{16}N_8OTi$ | 66.68 | 2.80 | 19.44 | — |
| Preparation Example | 67.08 | 2.95 | 19.26 | 0.1 |
| Example 1 | 66.12 | 2.71 | 18.66 | 1.0 |
| Example 2 | 66.05 | 2.77 | 18.75 | 1.3 |
| Example 3 | 65.19 | 2.66 | 18.78 | 1.7 |
| Example 4 | 65.91 | 2.72 | 18.95 | 1.3 |
| Comparative Example 1 | 66.82 | 2.79 | 19.42 | 0.1 |
| Comparative Example 2 | 66.55 | 2.71 | 19.22 | 0.1 |
| Comparative Example 3 | 66.71 | 2.70 | 19.30 | 0.2 |

Figure 9:
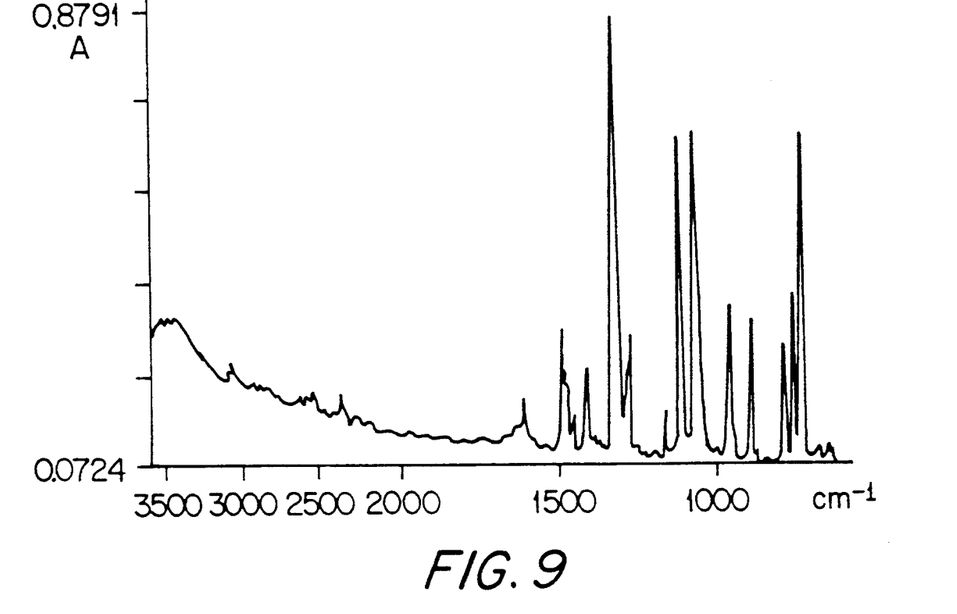
FIG. 9 is an infrared absorption spectrum of the oxytitanium phthalocyanine hydrate crystal obtained in Example 3.
Figure 10:
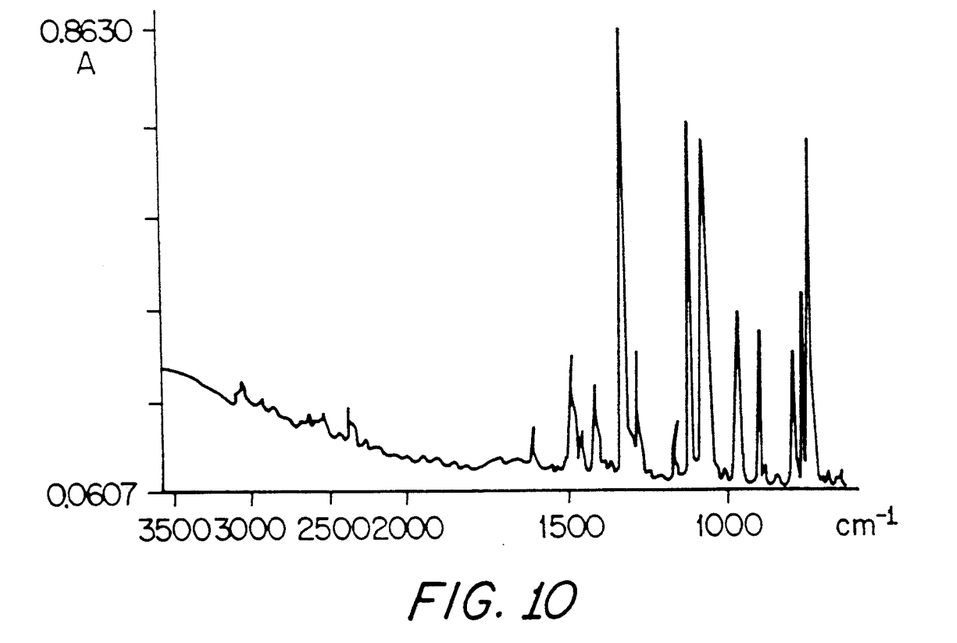
FIG. 10 is an infrared absorption spectrum of the oxytitanium phthalocyanine hydrate crystal obtained in Example 3, after being dried under reduced pressure.

An IR spectrum of the oxytitanium phthalocyanine hydrate crystal obtained in Example 3 is shown in FIG. 9, and in FIG. 10, an IR spectrum of the crystal after being dried for 24 hours at 200° C. and 0.1 mmHg is shown. In FIG. 10, the peak at 3,500 cm$^{-1}$ as found in FIG. 9, which as ascribable to the water of crystallization, disappeared. Also in Examples 1, 2 and 4, the same IR spectrums as in FIG. 9 were obtained

Figure 11:
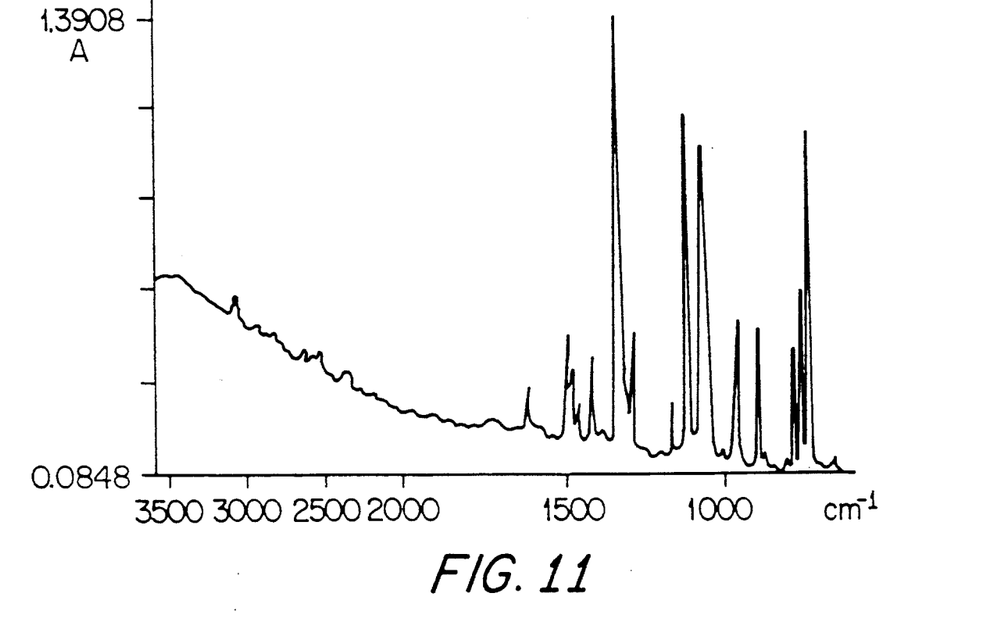
FIGS. 11 to 13 are infrared absorption spectrums of the oxytitanium phthalocyanine hydrate crystals obtained in Comparative Examples 1 to 3, respectively.
Figure 12:
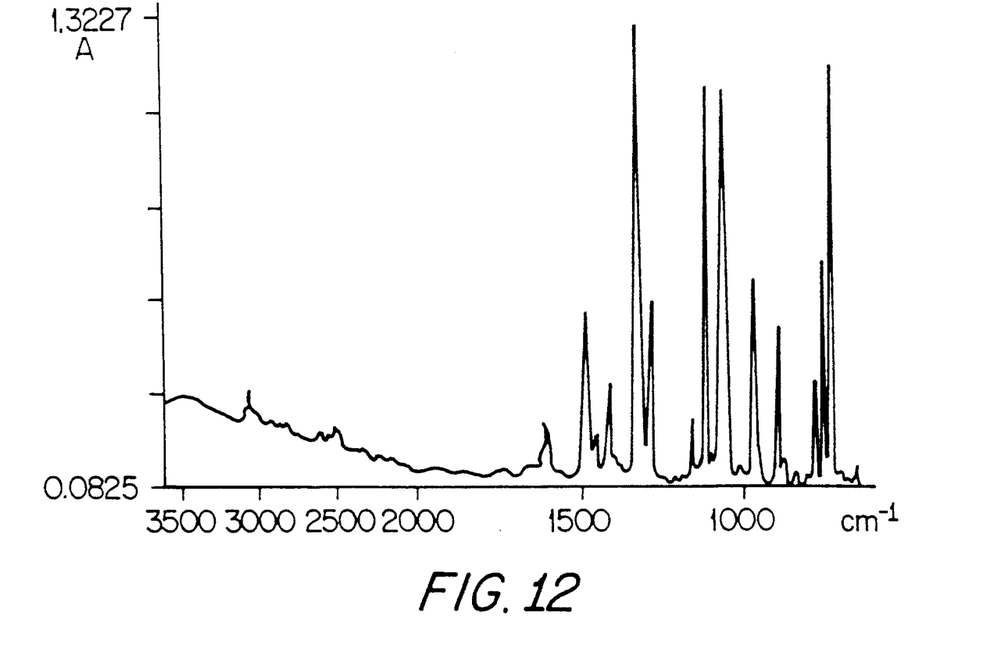
Figure 13:
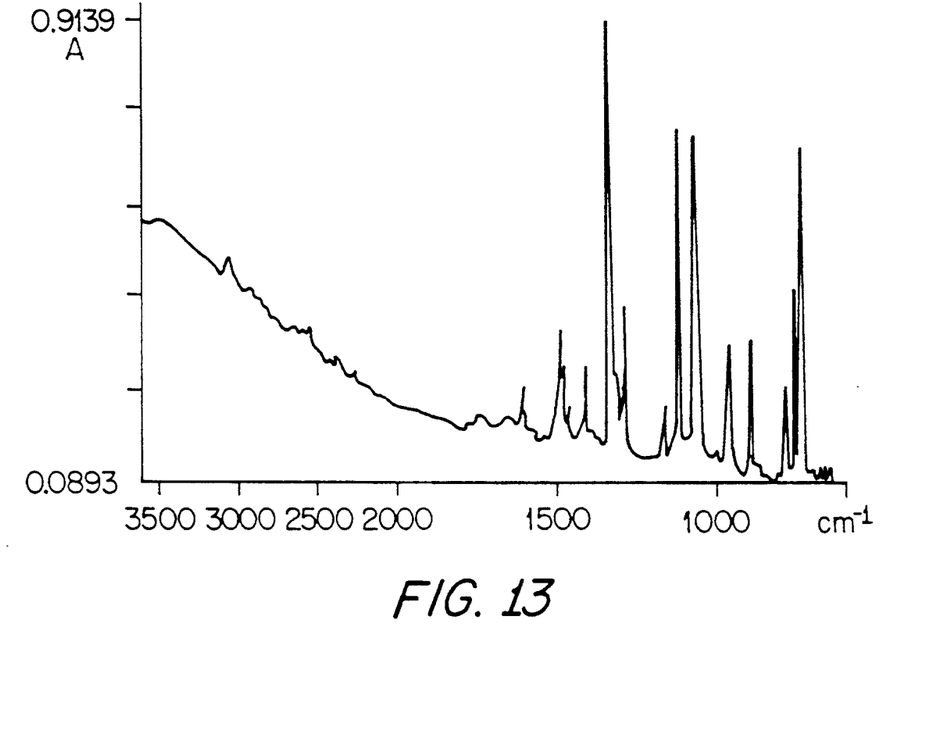
Figure 14A:
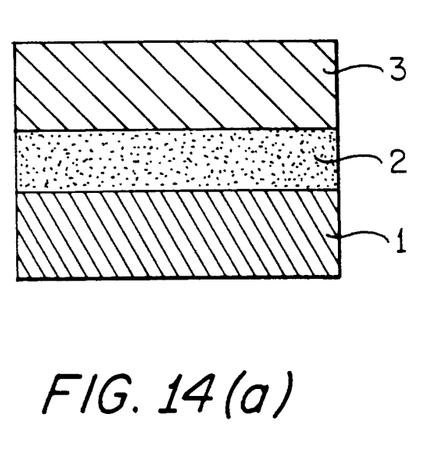
FIGS. 14 and 15 are schematic cross-sectional views of the electrophotographic photoreceptors of the present invention.
Figure 14B:
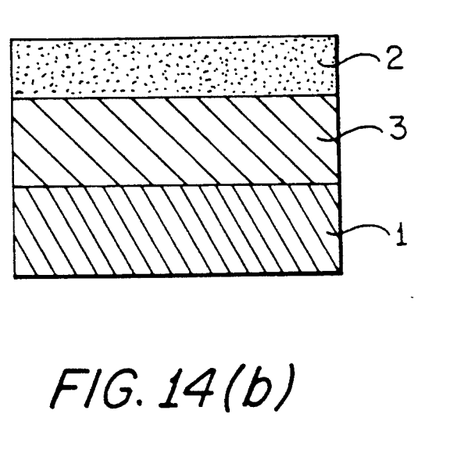
Figure 14C:
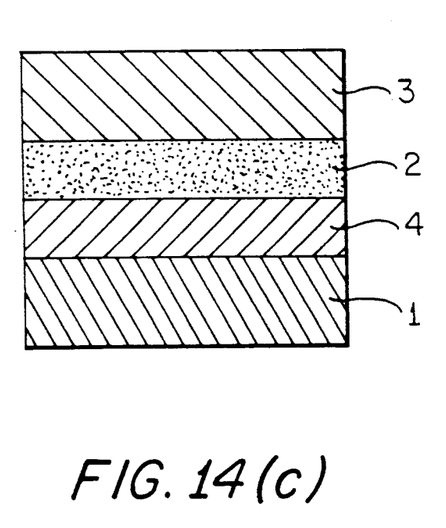
Figure 14D:
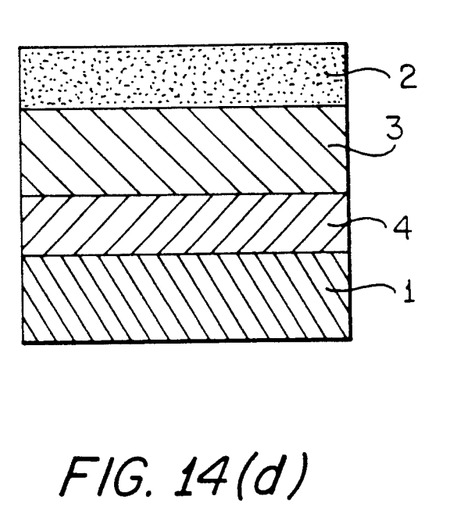

IR spectrums of the oxytitanium phthalocyanine crystals obtained in Comparative Examples 1 to 3 are shown in FIGS. 11 to 13. In these figures, no peak ascribable to the water of crystallization was observed.

EXAMPLES 5 to 8

1 part of each of the oxytitanium phthalocyanine hydrate crystals obtained in Examples 1 to 4 was mixed with 1 part of polyvinyl butyral (trade name: Eslek BM-S, produced by Sekisui Kagaku Co., Ltd.) and 100 parts of cyclohexanone, and then dispersed along with glass beads for 1 hour by the use of a paint shaker to obtain a coating solution. This coating solution was coated on an aluminum substrate by the dip coating method and dried by heating at 100° C. for 5 minutes to form a charge generating layer having a thickness of 0.2 μm.

1 part of a compound having the following formula:

and 1 part of poly(4,4-cyclohexylidenediphenylene carbonate) represented by the following structural formula:

where n is a degree of polymerization, were dissolved in 8 parts of monochlorobenzene. The thus-obtained coating solution was coated on the aluminum substrate on which the charge generating layer had been formed, by the dip coating method, and dried by heating at 120° C. for 1 hour to form a charge transporting layer having a thickness of 20 μm.

The thus-obtained electrophotographic photoreceptor was measured for electrophotographic characteristics under ordinary temperature and humidity conditions (20° C., 40% RH) by the use of an electrostatic copying paper testing apparatus (EPA-8100, produced by Kawaguchi Denki Co., Ltd.).

$V_{DDP}$: Surface potential after one second from negative charging by corona discharging of −6.0 KV.

$E_{1/2}$: Decay rate of electric potential by light of 800 nm dispersed by the us of a band pass filter.

$V_{RP}$: Surface potential after irradiation with white light of 50 erg/cm² for 0.5 second.

$\Delta E_{1/2}$: Variation amount under the circumstances of $E_{1/2}$ as measured under the above circumstances.

$\Delta V_{DDP}$: Variation amount between $V_{DDP}$ after 1,000 time repeating of the above charging and light exposure, and the initial $V_{DDP}$.

$\Delta V_{RP}$: Variation amount between $V_{RP}$ after 1,000 time repeating of the above charging and light exposure, and the initial $V_{RP}$.

The results are shown in Table 2.

COMPARATIVE EXAMPLES 4 TO 6

Electrophotographic photoreceptors were produced in the same manner as in Examples 5 to 8 except that the oxytitanium phthalocyanines obtained in Comparative Examples 1 to 3 were used each in the amount of 0.1 part, and their electrophotographic characteristics were measured in the same manner as in Examples 5 to 8. The results are shown in Table 2.

In order to clarify the sensitization effect due to the water of crystallization, each of the electrophotographic photoreceptors of Examples 5 to 8 and Comparative Examples 4 to 6 was allowed to stand for 24 hours at 100° C. under a reduced pressured of 0.1 mmHg) and then immediately evaluated under conditions of ordinary temperature and low humidity (20° C., 8%). The results are shown in Table 2.

TABLE 2

| | Electrophotographic Photoreceptor Characteristics (20° C., 40% RH) | | | Electrophotographic Photoreceptor Characteristics after Allowing to Stand under Reduced Presure (20° C., 8% RH) | | |
|---|---|---|---|---|---|---|
| | VDDP (V) | $E_{\frac{1}{2}}$ (erg/cm²) | VRP (V) | VDDP (V) | $E_{\frac{1}{2}}$ (erg/cm²) | VRP (V) |
| Ex. 5 | −840 | 1.2 | 10 | −840 | 1.6 | 15 |
| Ex. 6 | −835 | 1.2 | 10 | −835 | 1.5 | 10 |
| Ex. 7 | −850 | 1.1 | 5 | −850 | 1.5 | 10 |
| Ex. 8 | −840 | 1.3 | 15 | −840 | 1.8 | 20 |
| Com. Ex. 4 | −800 | 2.6 | 30 | −800 | 2.6 | 35 |
| Com. Ex. 5 | −820 | 4.2 | 35 | −820 | 4.3 | 40 |
| Com. Ex. 6 | −810 | 2.4 | 25 | −810 | 2.4 | 30 |

While the invention has been described in detail and with reference to specific embodiments thereof, it will be apparent to one skilled in the art that various changes and modifications can be made therein without departing from the spirit and scope thereof.

What is claimed is:

1. Oxytitanium phthalocyanine hydrate crystal having the structural formula, TiOPc(H₂O)$_n$, wherein Pc represents a phthalocyanine group, and n has a value from 0.15 to 1; and the elemental analysis values of C, H and N are as follows: C: 65.0 to 66.3%; H: 2.5 to 3.1%; and N: 18.5 to 19.3%.

2. The crystal as claimed in claim 1 wherein the ignition loss at 200° C. of the oxytitanium phthalocyanine hydrate crystal is in the range of 0.6 to 3%.

3. The crystal as claimed in claim 1 which has the maximum diffraction peak at a Bragg angle (2θ±0.2) of 27.3° in an X-ray diffraction spectrum thereof.

* * * * *